United States Patent
Army et al.

(10) Patent No.: US 10,514,065 B2
(45) Date of Patent: Dec. 24, 2019

(54) BEARING THERMAL MANAGEMENT SYSTEM AND METHOD

(71) Applicant: Hamilton Sundstrand Corporation, Windsor Locks, CT (US)

(72) Inventors: Donald E. Army, Enfield, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 782 days.

(21) Appl. No.: 14/968,246

(22) Filed: Dec. 14, 2015

(65) Prior Publication Data
US 2017/0167541 A1 Jun. 15, 2017

(51) Int. Cl.
*F16C 37/00* (2006.01)
*F28F 27/02* (2006.01)

(52) U.S. Cl.
CPC .............. *F16C 37/00* (2013.01); *F28F 27/02* (2013.01)

(58) Field of Classification Search
CPC ........ F16C 37/00; F01D 21/12; F01D 25/125; F28F 27/02
See application file for complete search history.

(56) References Cited

U.S. PATENT DOCUMENTS

| | | | |
|---|---|---|---|
| 2008/0178603 A1* | 7/2008 | Mons | F01D 21/003 60/779 |
| 2013/0074519 A1* | 3/2013 | Ertz | F02C 9/16 60/802 |
| 2015/0251766 A1* | 9/2015 | Atkey | B64D 13/08 244/13 |

FOREIGN PATENT DOCUMENTS

| | | |
|---|---|---|
| DE | 1038061 B | 9/1958 |
| EP | 0029736 A1 | 6/1981 |
| EP | 0547279 A1 | 6/1993 |

OTHER PUBLICATIONS

Extended European Search Report for EP Application No. 16201623.2, dated May 23, 2017, 10 pages.

* cited by examiner

*Primary Examiner* — Travis C Ruby
(74) *Attorney, Agent, or Firm* — Kinney & Lange, P.A.

(57) ABSTRACT

A system for managing a temperature of at least one bearing in an air cycle machine includes an inlet for allowing cooling air to enter the air cycle machine, at least one bearing downstream from the inlet and in fluidic connection with the inlet, an outlet downstream from the at least one bearing and in fluidic connection with the at least one bearing, a temperature sensor at a point between the inlet and the outlet, and an electronic controller electrically connected to and receiving temperature data from the temperature sensor with the electronic controller configured to modify an operation of the air cycle machine depending on the temperature data.

16 Claims, 4 Drawing Sheets

BEARING THERMAL MANAGEMENT SYSTEM AND METHOD

BACKGROUND

The present disclosure relates to aircraft environmental control systems. More specifically, the present disclosure relates to the management of an air cycle machine depending upon the temperature of bearings within the air cycle machine.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

Air cycle machines typically include rotating components mounted to a tie rod and a static housing surrounding the rotating components. A number of bearings can be used to keep the rotating components in place within the static housing. The bearings can be thrust bearings, journal bearings, and/or other bearings that can use foil, air, or both to support the rotating components. During operation, the bearings can experience elevated temperatures due to friction. If the temperature gets too high, the bearings can become damaged, reducing efficiency and possibly causing the air cycle machine to fail.

SUMMARY

A system for managing a temperature of at least one bearing in an air cycle machine includes an inlet for allowing cooling air to enter the air cycle machine, at least one bearing downstream from the inlet and in fluidic connection with the inlet, an outlet downstream from the at least one bearing and in fluidic connection with the at least one bearing, a temperature sensor at a point between the inlet and the outlet, and an electronic controller electrically connected to and receiving temperature data from the temperature sensor with the electronic controller configured to modify an operation of the air cycle machine depending on the temperature data.

A method for managing a temperature of at least one bearing in an air cycle machine includes introducing cooling air into a cooling flow path in an air cycle machine, directing cooling air adjacent to the at least one bearing, discharging cooling air from the cooling flow path through an outlet, measuring a temperature of the cooling air flowing through the outlet, and modifying an operation of the air cycle machine by an electronic controller depending on the temperature of the cooling air.

A system for managing a temperature of a bearing in an engine includes an inlet, a bearing downstream from the inlet, an outlet downstream from the bearing, a temperature sensor adjacent to the outlet, and an electronic controller electrically connected to the temperature sensor with the electronic controller modifying an operation of the engine depending on a temperature of cooling air flowing through the system.

The present summary is provided only by way of example and not limitation. Other aspects of the present disclosure will be appreciated in view of the entirety of the present disclosure, including the entire text, claims, and accompanying figures.

Figure 1:
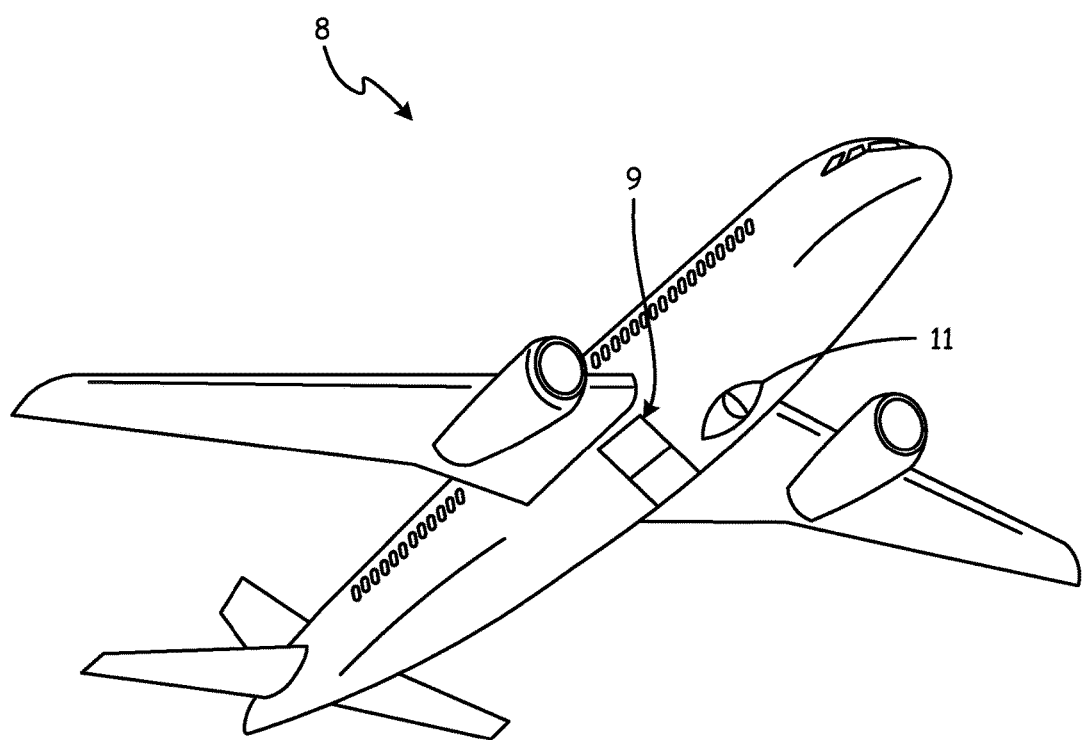
FIG. 1 is a perspective view of an aircraft.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A cooling air flow path for cooling an air cycle machine is disclosed herein that includes a temperature sensor to measure a temperature of the cooling air flowing through the cooling air flow path and an electronic controller that modifies the operation of the air cycle machine depending on the temperature of the cooling air and the cooling needs of an aircraft in which the air cycle machine is located. Elevated temperatures of the cooling air could signify a problem with the air cycle machine, but often times it is difficult to determine the root of the problem without halting operation and dismantling the air cycle machine. The electronic controller evaluates the temperature data and, depending on the temperature data and the cooling needs of the aircraft, modifies the operation of the air cycle machine to minimize damage to the air cycle machine if a problem is detected. If the electronic controller determines that the air cycle machine is experience a problem, such as bearings that are overheating, the electronic controller can modify the operation of the air cycle machine. The electronic controller can modulate a ram door to reduce the inlet operating temperature of the air cycle machine or adjust one or multiple valves to slow the rotational speed of the air cycle machine to reduce the loads on bearings. The electronic controller can also throttle the air cycle machine up or down through the use of turbine bypass valves or other means or halt operation of the air cycle machine to avoid damage to the bearings or other components. The electronic controller can halt operation of the air cycle machine if the temperature data reveals that the air cycle machine is sufficiently damaged such that continued operation would be ineffective and cause further damage.

FIG. 1 is a perspective view of an aircraft. Aircraft 8 includes wing-to-body fairing 9, within which air cycle machine 10 (see FIGS. 2 and 3) is usually contained. Adjacent to wing-to-body fairing 9 is ram air inlet 11, which is an opening in the fuselage of aircraft 8 that allows air to enter the inside of the fuselage where the air is used in various components, including the air cycle machine.

Figure 2:
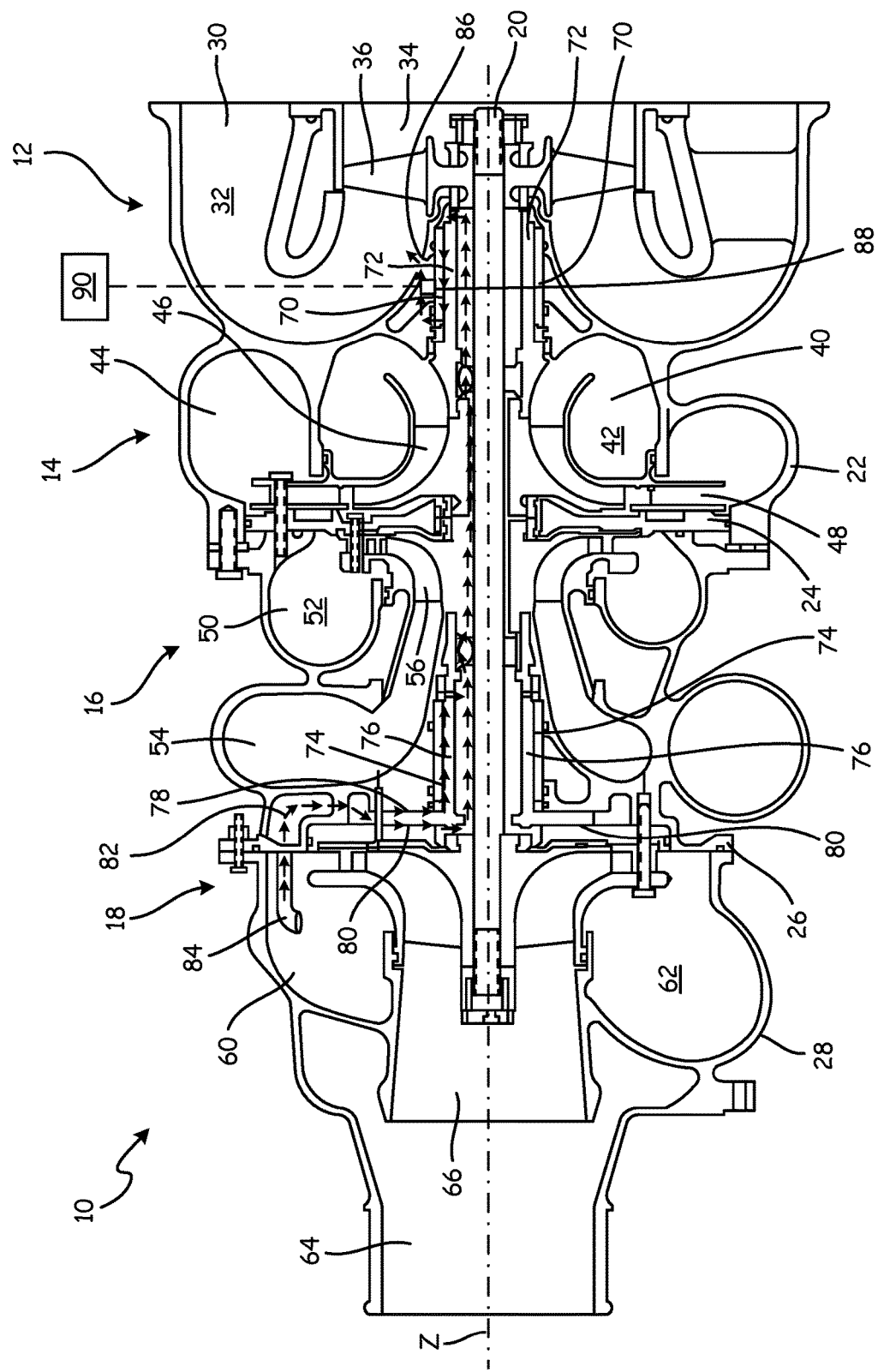
FIG. 2 is a cross-sectional view of an air cycle machine having two turbine sections.

FIG. 2 is a cross-sectional view of air cycle machine 10 having two turbine sections (a two stage air cycle machine), which includes fan section 12, compressor section 14, first turbine section 16, second turbine section 18, tie rod 20, fan and compressor housing 22, seal plate 24, first turbine housing 26, and second turbine housing 28. Also shown in FIG. 2 is axis Z.

Fan section 12, compressor section 14, first turbine section 16, and second turbine section 18 are all mounted on tie rod 20. Tie rod 20 rotates about axis Z. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 houses first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan outlet 34 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44.

First turbine section 16 includes first turbine inlet 50, first turbine duct 52, first turbine outlet 54, and first turbine rotor 56. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20.

Second turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Air cycle machine 10 further includes first journal bearing 70, first rotating shaft 72, second journal bearing 74, second rotating shaft 76, first thrust bearing 78, and second thrust bearing 80. First journal bearing 70 is positioned in fan section 12 and is supported by fan and compressor housing 22. First rotating shaft 72 extends between and rotates with fan rotor 36 and compressor rotor 46. A radially outer surface of first rotating shaft 72 abuts a radially inner surface of first journal bearing 70. Second journal bearing 74 is positioned in first turbine section 16 and is supported by first turbine housing 26. Second rotating shaft 76 extends between and rotates with first turbine rotor 56 and second turbine rotor 66. A radially outer surface of second rotating shaft 76 abuts a radially inner surface of second journal bearing 74. First thrust bearing 78 is positioned in first turbine section 16, is supported by first turbine housing 26, and prevents tie rod 20 and second rotating shaft 76 from moving axially toward fan section 12. Second thrust bearing 80 is positioned in second turbine section 18, is supported by first turbine housing 26, and prevents tie rod 20 and second rotating shaft 76 from moving axially toward second turbine section 18.

Air cycle machine 10 includes cooling air flow path 82 shown by arrows in FIG. 2. Cooling air enters cooling air flow path 82 at cooling air inlet 84, which is located within second turbine section 18 and, more specifically, adjacent to second turbine inlet 60. Cooling air then proceeds through first thrust bearing 78 and second thrust bearing 80 before flowing through second journal bearing 74 to cool those components. Flow path 82 then continues along tie rod 20 to first journal bearing 70, where cooling air cools first journal bearing 70 before exiting out cooling air outlet 86. Cooling air outlet 86 opens into fan duct 32, which then takes the cooling air out of air cycle machine 10 through fan outlet 34. Other configurations of cooling air flow path 82 can be present within air cycle machine 10 to cool first journal bearing 70, second journal bearing 74, first thrust bearing 78, second thrust bearing 80, and other components. As will be described below, air cycle machine 10 includes temperature sensor 88 along cooling air flow path 82 and electronic controller 90 adjacent air cycle machine 10 configured modify the operation of air cycle machine 10 depending on a temperature of the cooling air flowing through cooling air flow path 82 as measured by temperature sensor 88.

Figure 3:
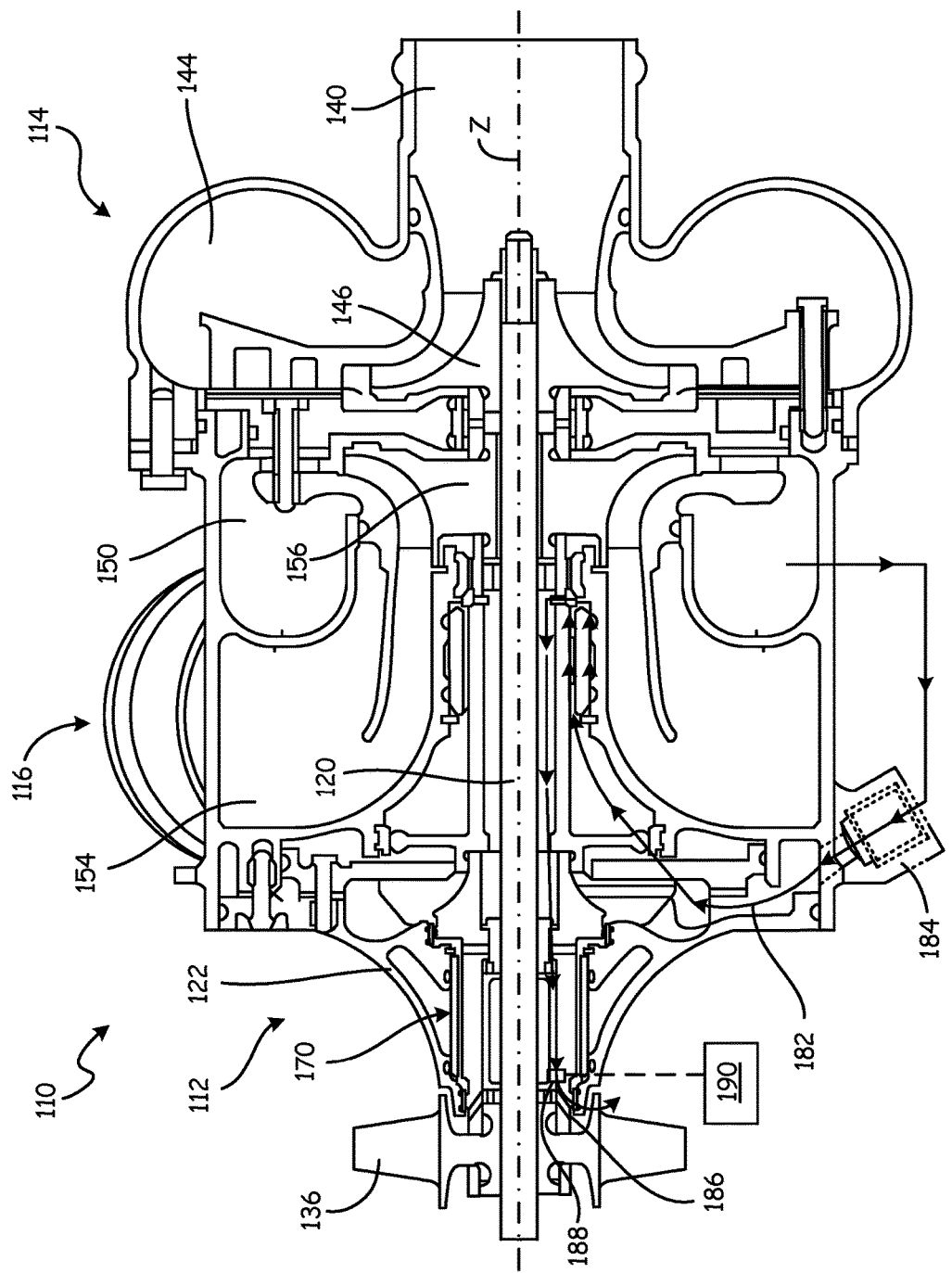
FIG. 3 is a cross-sectional view of an air cycle machine having one turbine section.

FIG. 3 is a cross-sectional view of air cycle machine 110 having only one turbine section (a single stage air cycle machine), which includes fan section 112, compressor section 114, turbine section 116, tie rod 120, and housing 122. Tie rod 120 rotates around central axis Z. Fan section 112, compressor section 114, and turbine section 116 are all mounted on tie rod 120. Fan section 112 includes fan rotor 136 and journal bearing 170. Compressor section 114 includes compressor inlet 140, compressor outlet 144, and compressor rotor 146. Turbine section 116 includes turbine inlet 150, turbine outlet 154, and turbine rotor 156. Air cycle machine 110 of FIG. 3 functions similarly to air cycle machine 10 of FIG. 2 except that air cycle machine 110 only has one turbine section 116 and cooling air flow path 182 has a slightly different path through air cycle machine 110.

Air cycle machine 110 includes cooling air flow path 182 shown by arrows in FIG. 3. Cooling air enters cooling air flow path 182 at cooling air inlet 184, which is located within turbine section 116. The cooling air can be bled from turbine inlet 150 or come from another source, such as an associated gas turbine or other aircraft component. Cooling air then proceeds through journal bearing 170 to cool journal bearing 170 before exiting out cooling air outlet 186. Cooling air outlet 186 is located within fan section 112. Other configurations of cooling air flow path 182 can be present within air cycle machine 110 to cool journal bearing 170 and other components. As will be described below, air cycle machine 110 includes temperature sensor 188 along cooling air flow path 182 and electronic controller 190 adjacent air cycle machine 110 configured to modify the operation of air cycle machine 110 depending on a temperature of the cooling air flowing through cooling air flow path 182 as measured by temperature sensor 188. Cooling air flow path 82 can include other components to vary the amount of cooling air flowing through cooling air flow path 182 to provide more or less cooling capacity to increase efficiency of air cycle machine 110.

Figure 4:
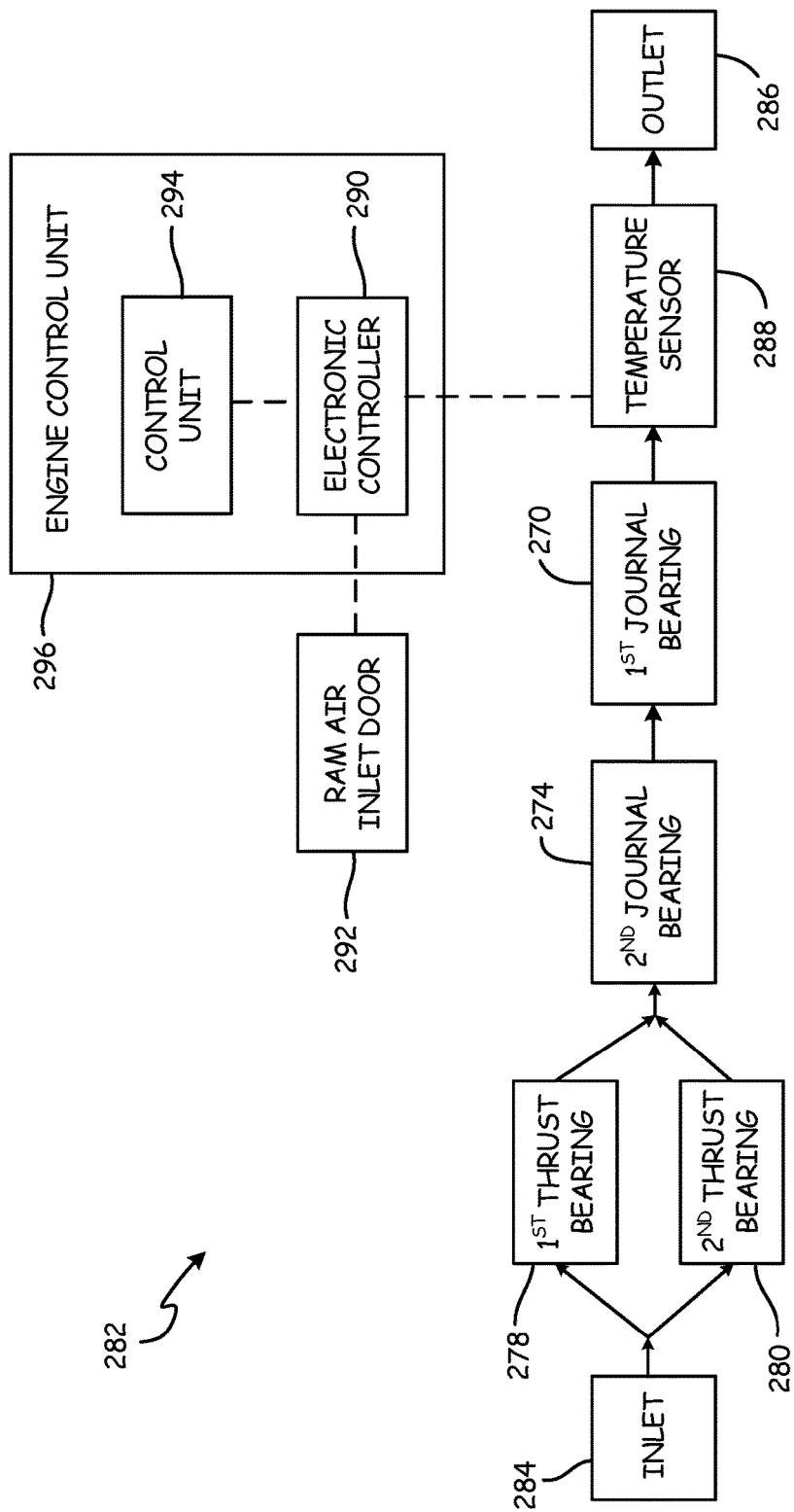
FIG. 4 is a schematic of a cooling air flow path including an electronic controller.

FIG. 4 is a schematic of a cooling air flow path. Cooling air flow path 282 includes cooling air inlet 284, first thrust bearing 278, second thrust bearing 280, second journal bearing 274, first journal bearing 270, temperature sensor 288, electronic controller 290 and cooling air outlet 286. Electronic controller 290 is in electrical communication with ram air inlet door 292 and control unit 294. Electronic controller 290 (and control unit 294) may be part of and encompassed within engine control unit 296, which may be an engine control unit or full authority digital engine control (FADEC) that monitors and controls the entire aircraft. Cooling air flow path 282 can be incorporated into an air cycle machine having one, two, or more turbine sections or other engines that require cooling of internal components.

As discussed briefly with regards to FIGS. 2 and 3, cooling air enters cooling air flow path 282 through cooling air inlet 284, which is an orifice that can be connected to a dry pressurized source or alternatively from an associated gas turbine or other aircraft component. Cooling air inlet 284 can have a filter to ensure the cooling air entering cooling air flow path 282 is free from particulates and impurities, or some other filtration system can be in place to filter the cooling air before it arrives at cooling air inlet 284. Cooling air inlet 284 can be placed in a variety of positions and locations around the air cycle machine, but should be configured to guide cooling air to first thrust bearing 278 and second thrust bearing 280 along cooling air flow path 282.

Downstream from cooling air inlet 284 are first thrust bearing 278 and second thrust bearing 280, which are known in the art and can be air bearings that prevent the tie rod or another shaft from axial movement. During operation of the air cycle machine, first thrust bearing 278 and second thrust bearing 280 can experience elevated temperature due to friction. This friction can cause the components of first thrust bearing 278 and/or second thrust bearing 280, such as a foil, to become damaged. Damage to first thrust bearing 278 and/or second thrust bearing 280 can reduce the efficiency of the air cycle machine or cause the air cycle machine to fail and halt operation. Therefore, it is important that the cooling air flowing through cooling air flow path 282 keeps first thrust bearing 278 and second thrust bearing 280 at a suitable temperature.

Downstream from first thrust bearing 278 and second thrust bearing 280 are second journal bearing 274 and first journal bearing 270 in series, which are known in the art and can be air bearings that support the tie rod or another shaft radially. Similar to first thrust bearing 278 and second thrust bearing 280, first journal bearing 270 and second journal bearing 274 can experience elevated temperature during operation due to friction between the tie rod or another shaft and the components of first journal bearing 270 and second journal bearing 274, respectively. This friction can cause damage, which can reduce the efficiency of the air cycle machine or cause the air cycle machine to fail and halt operation. To keep first journal bearing 270 and second journal bearing 274 at a suitable temperature, the cooling air flows through the bearings and around the components of the bearings. While the air cycle machine can have a number of configurations, FIG. 4 shows a configuration in which cooling air first flows through second journal bearing 274 and then through first journal bearing 270.

Along cooling air flow path 282, and preferably downstream from first journal bearing 270 (or if there are other bearings, downstream from the last bearing), is temperature sensor 288. Temperature sensor 288 is any sensor that is able to measure the temperature of the cooling air and convey that temperature data to electronic controller 290. Temperature sensor 288 can be located anywhere along cooling air flow path 282 but preferably can be located downstream from the bearing that is the most downstream in cooling air flow path 282 to get an accurate reading of the cooling air temperature after the cooling air has been used to cool the bearings. Temperature sensor 288 should be able to measure relatively high temperatures and preferably is a resistance temperature detector.

Electronic controller 290 is electrically connected to temperature sensor 288 and receives temperature data regarding the temperature of the cooling air from temperature sensor 288. Electronic controller 290 is electrically connected to ram air inlet door 292, control unit 294, and optionally other components of the aircraft to send instructions and receive data, such as a sensor that monitors the rotational speed of the air cycle machine. Electronic controller 290 can be a stand-alone computer process or other electronic component that is locally located near the air cycle machine and temperature sensor 288 or can be contained near or within an engine control unit or other master computer system such that electronic controller 290 is separate from the air cycle machine (i.e., separate from temperature sensor 288). Electronic controller 290 includes a logic that determines what action to take depending on the temperature of the cooling air and the cooling capacity needed from the air cycle machine. The action electronic controller 290 can take can be to modulate/adjust ram air inlet door 292 to increase or decrease the temperature of cooling air flowing through cooling air flow path 282, throttle the air cycle machine up or down through instructions to control unit 294 and/or through the use of turbine bypass valves, and/or halt operation of the air cycle machine. Other actions not explicitly mentioned in this disclosure may be taken by electronic controller 290 to modify operation of the air cycle machine.

Electronic controller 290 receives temperature data from temperature sensor 288 regarding the temperature of the cooling air flowing through cooling air flow path 282. The temperature of the cooling air can be indicative of the temperature of the bearings intended to be cooled by cooling air flow path 282 and/or indicative of a problem with the air cycle machine, such as a damaged or malfunctioning component. The amount of cooling air flowing through cooling air flow path 282 is proportional to the temperature of the bearings and the capacity of the air cycle machine, so an increase in temperature of the cooling air can mean that the air cycle machine has increased operational speed, there has been a decrease in the amount of cooling air flowing through cooling air flow path 282, and/or damage has occurred to one or multiple components within the air cycle machine. To prevent the bearings (first thrust bearing 278, second thrust bearing 280, second journal bearing 274, and first thrust bearing 270) from overheating and becoming damaged, electronic controller 290 can take one or many of the actions mentioned above.

Electronic controller 290 can instruct ram air inlet door 292 to open or close to alter the temperature of cooling air entering into cooling air flow path 282 through cooling air inlet 284. Ram air inlet door 292 may be instructed to open or open wider (if already open) when more capacity for cooling is needed from the air cycle machine and/or when the bearings in the air cycle machine are experiencing temperatures that are above a desired temperature. Ram air inlet door 292 may be instructed to close partially or completely when more efficiency from the air cycle machine is desired (because the intake of cooling air reduces efficiency) and/or when the bearings are at or below a desired temperature.

Electronic controller 290 can instruct control unit 294 to throttle the air cycle machine up or down (to increase or decrease operational speed) by adjusting turbine bypass valves, adjusting the amount of energy provided to the air cycle machine for operation, or other means for increasing or decreasing the operational speed of the air cycle machine. The air cycle machine may be throttled down when less cooling capacity is needed, when increased efficiency is needed (throttling down puts less stress on the bearings, allowing the bearings to cool down, thereby decreasing the need for cooling air and increasing efficiency), when the bearings have become too hot (i.e., are experiencing temperatures above a desired temperature) and increasing the cooling air flowing through cooling air flow path 282 does not meet the cooling needs or when increasing the cooling air is not feasible, and/or when one or more components within the air cycle machine have become damaged. Additionally, electronic controller 290 can be configured to directly adjust the turbine bypass valves or otherwise throttle up or down the air cycle machine without communicating with control unit 294 or another on-board computer control system. Control unit 294 can be a control system that only monitors and controls the air cycle machine, monitors and controls a select number of components, or is contained within an engine control unit or other master control system.

Electronic controller 290 can also instruct control unit 294 to halt operation of the air cycle machine, or electronic controller 290 can halt operation of the air cycle machine itself without relaying instructions to control unit 294. The air cycle machine may need to be shut off completely if the temperature of the cooling air becomes too elevated, other actions to reduce the temperature of the cooling air (and, therefore, of the bearings) are ineffective, or it is determined that one or more components within the air cycle machine are damaged.

Additionally, electronic controller 290 can record and store the temperature data provided by temperature sensor 288, control unit 294, and/or engine control unit 296 to electronic controller 290 for use in air cycle machine performance analysis, such as engine health monitoring and fault diagnosis. Electronic controller 290 can also be in communication with a sensor that monitors the rotational speed of the air cycle machine and can be configured to analyze the temperature data and speed data to alter and maximize system performance. The temperature data can be useful in determining whether the bearings within cooling air flow path 282 have deteriorated or are deteriorating over time to be able to accurately determine the efficiency of the air cycle machine and when maintenance is needed.

Downstream from first journal bearing 270 is cooling air outlet 286, which allows cooling air to exit cooling air flow path 282 into the environment. Cooling air outlet 286 can be a variety of configurations and locations, but should be configured to allow cooling air to exit cooling air flow path 282 without any resistance.

Cooling air flow path 282, including temperature sensor 288 and electronic controller 290, can be utilized in any type of engine that requires cooling air to cool engine components, not just an air cycle machine. The configuration and orientation of cooling air flow path 282 and the components within cooling air flow path 282 can be modified for use in a variety of engines.

As mentioned above, cooling air flow path 282 for cooling the air cycle machine includes (among other components) temperature sensor 288 to measure the temperature of the cooling air flowing through cooling air flow path 282 and electronic controller 290 that modifies the operation of the air cycle machine depending on the temperature of the cooling air and the cooling needs of aircraft 8 (see FIG. 1) in which the air cycle machine (discussed in regards to FIGS. 2 and 3) is located. Elevated temperatures of the cooling air could signify a problem with the air cycle machine, but often times it is difficult to determine the root of the problem without halting operation and dismantling the air cycle machine. Electronic controller 290 can modify the operation of the air cycle machine to increase capacity of the air cycle machine, increase efficiency of the air cycle machine, or minimize damage to the air cycle machine if a problem is detected (such as bearings that are overheating). Electronic controller 290 can modulate ram air inlet door 292 to reduce the temperature of the air entering cooling air inlet 284 of the air cycle machine or adjust one or multiple valves to slow the rotational speed of the air cycle machine to reduce the loads on bearings. Electronic controller 290 can also throttle the air cycle machine up or down through the use of turbine bypass valves or other means or halt operation of the air cycle machine to avoid damage to the bearings or other components. Electronic controller 290 can halt operation of the air cycle machine if the temperature data reveals that the air cycle machine is sufficiently damaged such that continued operation would be ineffective and cause further damage. Electronic controller 290 takes actions to prevent the bearings from overheating and increase the efficiency of the air cycle machine.

Discussion of Possible Embodiments

The following are non-exclusive descriptions of possible embodiments of the present invention.

A system for managing a temperature of at least one bearing in an air cycle machine includes an inlet for allowing cooling air to enter the air cycle machine, at least one bearing downstream from the inlet and in fluidic connection with the inlet, an outlet downstream from the at least one bearing and in fluidic connection with the at least one bearing, a temperature sensor at a point between the inlet and the outlet, and an electronic controller electrically connected to and receiving temperature data from the temperature sensor with the electronic controller configured to modify an operation of the air cycle machine depending on the temperature data.

The system of the preceding paragraph can optionally include, additionally and/or alternatively, any one or more of the following features, configurations, and/or additional components:

The electronic controller is configured to adjust at least one valve to modify the amount of air flowing through the air cycle machine.

The electronic controller is configured to adjust a ram air inlet door to vary the amount of air flowing through the inlet.

The electronic controller is configured to throttle the air cycle machine up or down.

The electronic controller is configured to shut the air cycle machine off when the temperature data indicates that a temperature of the cooling air is greater than a desired temperature.

The at least one bearing includes a thrust bearing and a journal bearing.

The electronic controller is configured to collect and store the temperature data for use in air cycle machine performance analysis.

The temperature sensor is a resistance temperature detector.

The electronic controller is located adjacent to the temperature sensor.

The electronic controller is encompassed within an engine control unit.

A method for managing a temperature of at least one bearing in an air cycle machine includes introducing cooling air into a cooling flow path in an air cycle machine, directing cooling air adjacent to the at least one bearing, discharging cooling air from the cooling flow path through an outlet, measuring a temperature of the cooling air flowing through the outlet, and modifying an operation of the air cycle machine by an electronic controller depending on the temperature of the cooling air.

The method of the preceding paragraph can optionally include, additionally and/or alternatively, any one or more of the following features, configurations, steps, and/or additional components:

The step of adjusting a valve to vary an amount of air flowing through the air cycle machine when the temperature of the cooling air is greater than or less than a desired temperature.

The step of adjusting an amount of air flowing through the inlet further includes modulating a ram air inlet door to adjust the amount of air flowing through the inlet.

The step of modifying the operation of the air cycle machine by the electronic controller further includes throttling the air cycle machine up or down.

The step of modifying the operation of the air cycle machine by the electronic controller further includes shutting the air cycle machine off when the temperature of the cooling air is greater than a desired temperature.

A system for managing a temperature of a bearing in an engine includes an inlet, a bearing downstream from the inlet, an outlet downstream from the bearing, a temperature sensor adjacent to the outlet, and an electronic controller electrically connected to the temperature sensor with the electronic controller modifying an operation of the engine depending on a temperature of cooling air flowing through the system.

The system of the preceding paragraph can optionally include, additionally and/or alternatively, any one or more of the following features, configurations, and/or additional components:

The electronic controller is configured to adjust at least one valve to modify the amount of air flowing through the engine.

The electronic controller instructs a ram air inlet door to open or close to vary the amount of air flowing through the inlet depending on the temperature of the cooling air.

The electronic controller throttles the engine up or down depending on the temperature of the cooling air.

The electronic controller shuts the engine off when the temperature of the cooling air is greater than a desired temperature.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for managing a temperature of at least one bearing in an air cycle machine, the system comprising:
    an inlet for allowing cooling air to enter the air cycle machine;
    a ram air inlet door at the inlet;
    at least one bearing downstream from the inlet and in fluidic connection with the inlet;
    an outlet downstream from the at least one bearing and in fluidic connection with the at least one bearing;
    a temperature sensor adjacent to and downstream from the at least one bearing, the temperature sensor configured to measure a temperature of the cooling air after the cooling air has passed through the at least one bearing; and
    an electronic controller electrically connected to and receiving temperature data from the temperature sensor, the electronic controller configured to modify an operation of the air cycle machine depending on the temperature data,
    wherein the electronic controller is configured to open the ram air inlet door when the temperature data from the temperature sensor indicates that at least one bearing is experiencing an operating temperature above a threshold temperature.

2. The system of claim 1, wherein the electronic controller is further configured to throttle the air cycle machine up or down when the temperature data from the temperature sensor indicates that at least one bearing is experiencing an operating temperature above the threshold temperature.

3. The system of claim 1, wherein the electronic controller is further configured to shut the air cycle machine off to prevent damage to the air cycle machine when the temperature data indicates that an operating temperature of the at least one bearing is greater than the threshold temperature.

4. The system of claim 1, wherein the at least one bearing includes a thrust bearing and a journal bearing.

5. The system of claim 1, wherein the electronic controller is configured to collect and store the temperature data for use in air cycle machine performance analysis.

6. The system of claim 1, wherein the temperature sensor is a resistance temperature detector.

7. The system of claim 1, wherein the electronic controller is located adjacent to the temperature sensor.

8. The system of claim 1, wherein the electronic controller is encompassed within an engine control unit.

9. A method for managing a temperature of at least one bearing in an air cycle machine, the method comprising:

introducing cooling air into a cooling flow path in an air cycle machine;

directing cooling air adjacent to the at least one bearing;

discharging cooling air from the cooling flow path through an outlet;

measuring a temperature of the cooling air flowing through the cooling flow path with a temperature sensor located adjacent to and downstream from the at least one bearing; and modifying an operation of the air cycle machine by an electronic controller by opening a ram inlet door at an inlet of the cooling flow path when temperature data from the temperature sensor indicates that the at least one bearing is experiencing an operating temperature that is greater than a desired temperature.

10. The method of claim 9, the step of modifying the operation of the air cycle machine by the electronic controller further comprising:

modulating the ram air inlet door to adjust the temperature of air flowing through the inlet.

11. The method of claim 9, the step of modifying the operation of the air cycle machine by the electronic controller further comprising:

throttling the air cycle machine up or down.

12. The method of claim 9, the step of modifying the operation of the air cycle machine by the electronic controller further comprising:

shutting the air cycle machine off to prevent damage to the air cycle machine when the temperature of the cooling air is greater than a desired temperature.

13. A system for managing a temperature of a bearing in an air cycle machine, the system comprising:

an inlet;

a bearing downstream from the inlet;

an outlet downstream from the bearing;

a temperature sensor adjacent to the bearing and configured to measure a temperature of cooling air after the air has passed through the bearing; and an electronic controller electrically connected to the temperature sensor, the electronic controller modifying an operation of the engine by opening a ram inlet door at the inlet when temperature data from the temperature sensor indicates that the bearing is experiencing an operating temperature that is greater than a desired temperature.

14. The system of claim 13, wherein the electronic controller instructs a ram air inlet door to open or close to vary the temperature of air flowing through the inlet depending on the temperature of the cooling air.

15. The system of claim 13, wherein the electronic controller throttles the engine up or down depending on the temperature of the cooling air.

16. The system of claim 13, wherein the electronic controller shuts the engine off to prevent damage to the air cycle machine when the temperature of the cooling air is greater than a desired temperature.

* * * * *